Nov. 3, 1964     D. MAAS ETAL     3,155,023
AUTOMATIC CAMERAS

Filed Oct. 8, 1962     4 Sheets-Sheet 1

INVENTORS
DIETER MAAS
DIETER ENGELSMANN
BY
Michael S. Striker
Atty

Nov. 3, 1964

D. MAAS ETAL 3,155,023

AUTOMATIC CAMERAS

Filed Oct. 8, 1962

INVENTOR.
DIETER MAAS
DIETER ENGELSMANN

BY

Michael S. Striker

United States Patent Office 3,155,023
Patented Nov. 3, 1964

3,155,023
AUTOMATIC CAMERAS
Dieter Maas, Munich, and Dieter Engelsmann, Unterhaching, near Munich, Germany, assignors to Agfa Aktiengesellschaft, Leverkusen, Germany
Filed Oct. 8, 1962, Ser. No. 228,839
Claims priority, application Germany, Oct. 11, 1961,
A 38,543, A 38,544
17 Claims. (Cl. 95—10)

The present invention relates to cameras.

More particularly, the present invention relates to automatic cameras which are automatic in the sense that they are capable of automatically setting at least one of the exposure-determining factors. Thus, in any camera the exposure will be determined by such factors as the exposure time, the exposure aperture, the film speed, etc. With the camera of the present invention one of these factors, such as the exposure aperture, for example, is capable of being automatically set.

With cameras of this type it is necessary to adjust the structure which operates automatically in order to compensate for manual settings which are made. For example, it is well known to adjust the angular position of a light meter when a setting is made in accordance with the speed of the particular film which is used in the camera. Particular problems arise, however, when the operator introduces manual settings during the time when the automatic structure is operating, since there is a conflict between the adjustment of the automatic structure to compensate for manual settings and the simultaneous operation of the automatic structure. Moreover, in cameras which have interchangeable objectives it is necessary to take into consideration the fact that different objectives will have the capability of providing different exposure apertures. Thus, while one objective may have a maximum aperture of a certain size another objective will have a maximum aperture of a different size, and it is therefore necessary to make further adjustments in order to take into consideration the particular characteristics of that one of a plurality of interchangeable objectives which happens to be connected to the camera. Furthermore, there is a certain difficulty involved in the fact that the operator may not know the range of settings which can be provided with a particular one of a plurality of interchangeable objectives.

It is accordingly a primary object of the present invention to provide for a camera of the above type a structure which will enable manual settings to be made even during operation of the automatic structure without disturbing the operation thereof in any way.

Another object of the present invention is to provide a structure which not only will enable manual settings to be made during operation of the automatic structure, but which will in addition adjust the automatic structure in accordance with the manual settings made during operation of the automatic structure but in a fully automatic manner as soon as the automatic structure stops operating.

Still another object of the present invention is to provide for a camera of the above type a structure which will adjust the automatic assembly in accordance with manual settings as well as in accordance with the particular characteristics of one of a plurality of interchangeable objectives which is attached to the camera.

An additional object of the present invention is to provide for a camera of the above type a structure which will not only adjust the automatic, light-responsive assembly in accordance with the characteristics of a particular objective and in accordance with settings which are manually made, but which will also render visible to the operator one of a plurality of scales corresponding to the particular objective which is attached to the camera and indicating the range of settings which are possible with the particular objective which is attached to the camera.

It is furthermore an object of the present invention to provide a structure which can accomplish all of the above objects and which at the same time is quite simple and rugged as well as very reliable in operation.

With the above objects in view, the invention includes, in a camera which is adapted to have one of a plurality of interchangeable objectives attached thereto, a pair of means for automatically setting the camera according to one of a plurality of exposure-determining factors, such as the aperture of the diaphragm of the camera. This pair of means includes a light meter means which has a movable member and a scanning means which scans the position of the movable member in order to provide the automatic setting of the camera. In addition, other exposure-determining factors, such as the exposure time, for example, are capable of being manually set by a manually operable setting means, and a transmission means connects the manually operable setting means to a moving means which moves one of the above-mentioned pair of means relative to the other in order to adjust the pair of means in accordance with the manual setting. The means which moves one of the above-mentioned pair of means relative to the other is also actuated by a means which is carried by each of the objectives when one interchangeable objective is exchanged for another, so that an adjustment of the pair of means which automatically set the camera, one relative to the other, is also carried out when a new objective is connected to the camera. The structure includes an indicating means which carries a plurality of scales which respectively correspond to the plurality of interchangeable objectives, and a positioning means cooperates with the indicating means for positioning, in a position where the operator can see it, one of the scales which corresponds to the particular objective which is attached to the camera, and this positioning means is also actuated by attaching a particular objective to the camera, so that there is automatically placed in view of the operator that scale which corresponds to the particular objective which has been attached to the camera.

The scanning means is released by a manually operable release means, and this manually operable release means also serves to release a lock means which locks the moving means, which moves one of the above-mentioned pair of means relative to the other, so that in this way there can be no relative movement between the light meter means and the scanning means during the time that the latter scans the movable member of the light meter means. However, in accordance with the present invention, the transmission means between the manually operable setting means and the moving means includes a storing structure capable of storing the settings made by the manually operable setting means during the time when the moving means is locked against movement, and as soon as this moving means is unlocked the storing means operates to introduce the settings which are manually made and thus the adjustments will be made automatically as soon as the moving means is unlocked.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
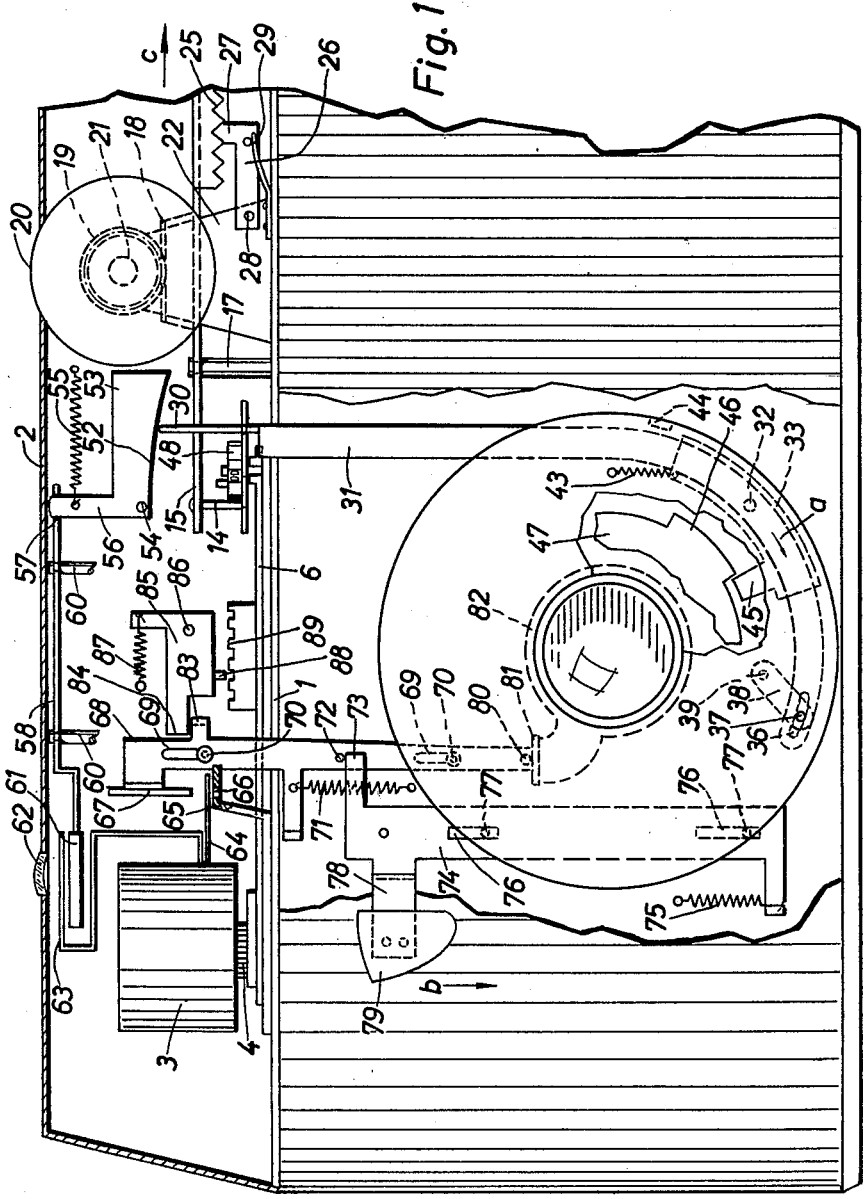
FIG. 1 is a fragmentary front elevation of one possible embodiment of a camera according to the present invention, various parts of the structure of the camera being shown diagrammatically in FIG. 1 for the sake of clarity.
Figure 2:
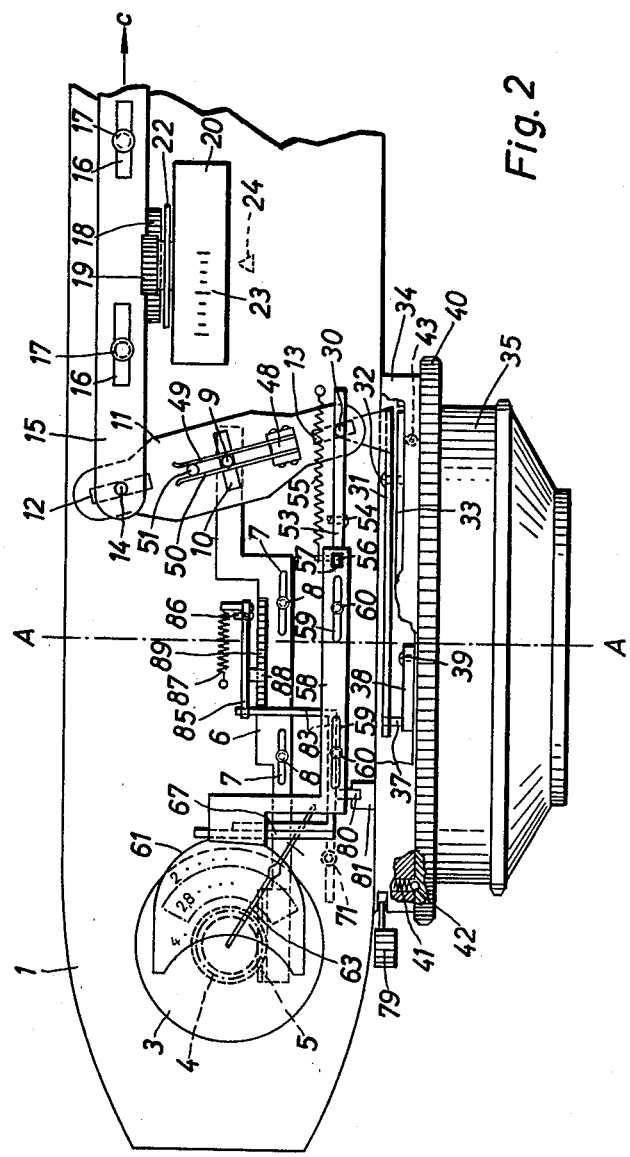
FIG. 2 is a fragmentary top plan view of the structure of FIG. 1, the top cover member of the camera of FIG. 1 being removed so as to clearly illustrate the structure in FIG. 2.

Referring to FIGS. 1 and 2, there is shown therein a camera which will automatically set the diaphragm in accordance with the lighting conditions after the operator has preselected the exposure time and the film speed, the diaphragm being set not only in accordance with the lighting conditions but also in accordance with the speed of the film and the selected exposure time.

The camera housing has a top wall 1 which carries a cap 2 which defines with the top wall 1 of the camera housing a space at the upper part of the camera, and in this space is located a light meter means 3 which may, for example, take the form of a galvanometer actuated from a photocell or from a photosensitive electrical resistor, as is well known in the art. The meter 3 is coaxially fixed with a pinion 4 which meshes with a rack 5 which is fixed to and extends along an elongated moving member 6 which is supported and guided for longitudinal movement by way of a pair of elongated slots 7 formed in and extending longitudinally of the member 6 and receiving a pair of stationary pins 8 which are fixed to the upper wall 1 of the camera housing, so that in this way the member 6 is guided for movement to the right and left, as viewed in FIGS. 1 and 2. This elongated member 6 together with the rack 5 and the pinion 4 form a moving means for moving the light meter means 3 so as to change the angular position thereof.

A transmission means cooperates with the elongated moving member 6 for moving the latter, and this transmission means includes a pin 9 which is fixed to and extends upwardly from the elongated member 6. The transmission means also includes an elongated lever 11 formed intermediate its ends with a transverse elongated slot 10 which receives the pin 9, so that in this way the lever 11 is pivotally connected to the member 6 through the pin 9. At its opposite end portions the lever 11 is formed with longitudinally extending slots 12 and 13 which respectively receive pins 14 and 30. The pin 14 is fixed to an elongated motion transmitting member 15 formed with longitudinal slots 16 receiving stationary pins 17 so that in this way the member 15 is guided for movement to the right and left, as viewed in the drawings, and the pins 17 are fixedly carried by the wall 1. The elongated member 15 fixedly carries a rack 18 which meshes with a pinion 19 which is fixedly carried by a shaft 21 which is supported for rotary movement by a suitable bearing carried by the support 22 which is mounted on the plate 1, and the shaft 21 also fixedly carries a disc 20 which extends through a suitable aperture formed in the cover 2 and which carries a scale 23 of film speeds adapted to be selectively aligned with the stationary index 24 carried by the cover 2 at its upper surface, as shown diagrammatically in FIG. 2.

In order to avoid inadvertent turning of the adjusting member 20, which forms a manually operable setting means for setting into the camera the speed of the particular film which is used in the camera, the elongated motion transmitting member 15 fixedly carries a row of teeth 25 which are engaged by the toothed end of a lever 27 which is supported for turning movement by a stationary pin 28 carried by the support 22, and a spring 29 which is carried by the plate 1 engages a pin carried by the lever 27 so as to urge the toothed end thereof into engagement with the row of teeth 25 so as to form a releasable detent structure releasably holding the member 15, and thus the manually operable setting means 20, in its set position, so as to prevent inadvertent movement thereof in this way.

The pin 30 which extends through the slot 13 is fixed to and forms an integral extension of an elongated lever 31. The lever 31 is pivotally connected to a support means 33 by a pivot pin 32, and the support means 33 is in the form of an arcuate member guided for movement along a circle whose center is in the optical axis, the guiding structure for the support means 33 not being shown in the drawing for the sake of clarity. This support member 33 is located within the shutter housing 34 (FIG. 2) which is fixedly carried by the camera, and in a suitable guide the member 33 is guided for movement around the optical axis A—A indicated in FIG. 2, and of course the optical axis of the interchangeable objective 35 coincides with the optical axis A—A. At its end distant from the pin 30, the lever 31 has an arcuate portion extending through approximately 90° about the optical axis, and the pin 32 is located approximately at the central part of the arcuate portion of the lever 31. At its end distant from the pin 30 the lever 31 is formed with an elongated slot 36 which receives a pin 37 which is fixed to a lever 38 which is in turn fixed to a rotary shaft 39 which is turned in a manner well known in the art during setting of the exposure time. The operator turns the ring 40 (FIG. 2) in order to manually introduce into the camera the selected exposure time, and in a manner which is well known in the art and therefore not illustrated the turning of the ring 40 will result in turning of the shaft 39 and thus turning of the lever 38 and the pin 37 which is in the slot 36. A reasable holding means is provided for releasably holding the ring 40 in the position which provides the selected exposure time, and this releasable holding means includes (FIG. 2) a spring 41 urging a ball 42 into one of the plurality of recesses formed in the ring 40. This structure will retain the ring 40 against inadvertent movement from the position to which it has been manually set, in the same way that the lever 26 cooperates with the teeth 25 for releasably holding the film-speed setting member 20 against movement, as described above.

A spring 43 is fixedly connected at one end to the shiftable support means 33, and the other end of the spring 43 is fixed to a stationary member, carried by the shutter housing 34, so that the spring 43 tends to move the support member 33 upwardly into engagement with a stationary stop member 44 carried in the shutter housing 34. The support means 33 fixedly carries a projection 45 which extends radially toward the optical axis, and each of the interchangeable objectives carries a means which cooperates with the support means 33 for positioning the latter according to the characteristics of the particular objective. This means which is carried by each objective takes the form of a projection 46 projecting from the mounting part 47 of the objective. The interchangeable objective is attached to the camera through a bayonet connection, and during the turning of the objective relative to the camera housing to its final position where it is fully connected thereto the projection 46 turns in a clockwise direction, as viewed in FIG. 1, so as to engage the projection 45 and shift the support means 33 in opposition to the spring 43 to a position spaced from the stop member 44 in accordance with the largest exposure aperture which can be provided by the diaphragm carried by the particular objective. Thus, the different objectives will have projections 46 which are positioned differently in accordance with the largest aperture which can be provided by the diaphragms of the objectives, and when each objective is attached to the camera it will automatically position the support means 33 in a position which will be determined by the largest aperture which can be provided by the diaphragm of the particular objective.

The lever 11 carries (FIG. 2) a bracket 48 to which are fixed the ends of a pair of leaf springs 49 and 50 which respectively engage opposite sides of the pin 9 as well as opposite sides of a pin 51 which is carried by the lever 11. The springs 49 and 50 extend perpendicularly across the slot 10 and cooperate with the pin 51 to position the lever 11 and the pin 9 with respect to each other in a predetermined position where the pin 9 is located at the center of the slot 10.

It is apparent that the lever 31 forms an actuating means for actuating the moving means 4–6 in accordance with settings manually made by turning of the ring 40, so that in this way the light meter means 3 will be adjusted relative to a scanning means, described below, in accordance with the manually set exposure time, and at the same time the lever 11 is capable of being turned in order to set the position of the light meter means 3 in accordance with the film speed which is introduced by manual turning of the ring 20. The pair of springs 49 and 50 provide in the transmission to the moving means 4–6 from the pair of manually operable setting means 40 and 20 a storing means for storing the settings made by the manually operable means 40 and 20, for a purpose described below, and furthermore the lever 11 is capable of combining the manual settings made by the pair of manually operable setting means 40 and 20 in order to set the light meter 3 at an angular position which compensates for these manual settings.

The upper end of the lever 31, which is to say the upper free end of the pin 30 of the lever 31, engages a curved edge 52 of a lever 53 which forms a positioning means for a purpose described below. The radius of curvature of the curved edge 52 corresponds to the distance between the pivotal connection 32 of the lever 31 to the support means 33 and the free end of the lever 31 which engages the edge 52. The positioning lever 53 is supported for turning movement by a stationary pivot pin 54, and a spring 55 is operatively connected to the arm 56 of the positioning lever 53 for urging the latter in clockwise direction about the pin 54 so as to maintain the curved edge 52 against the upper free end of the lever 31. The pivot pin 54 is carried by an unillustrated stationary support similar to the support 22 which supports the shaft 21 for rotary movement. The free end of the spring 55 may also be connected to a support similar to the support 22. The upper free end of the arm 56 of the positioning lever 53 extends through an opening 57 of an elongated indicating means 58.

The elongated indicating means 58 is in the form of an elongated member formed with a pair of longitudinal slots 59 receiving the stationary pins 60 which are fixedly carried by the plate 1, so that in this way the indicating means 58 is guided for movement to the right and left, as viewed in FIGS. 1 and 2, and at its left end, as viewed in FIGS. 1 and 2, the indicating means 58 carries a scale-carrier 61 which is provided at its upper face with a plurality of scales of aperture sizes respectively corresponding to the aperture sizes which can be provided by the diaphragms of the several interchangeable objectives. The top wall of the cover 2 is formed with a window 62 through which one of the scales carried by the carrier 61 of the indicating means is visible. The scales extend along the arcs of concentric circles and the window 62 also extends along such an arc, as indicated in dot-dash lines in FIG. 2, so that at any one time in accordance with the positioning of the indicating means 58 provided by the positioning means 53 there will be visible through the window 62 that scale, carried by the scale-carrier 61, which corresponds to the particular objective 35 which happens to be attached to the camera. A pointer 63 of the light meter means 3 has an upper portion extending over the carrier 61 and visible through the window 62, so that the operator can observe the diaphragm setting which is made with the automatic structure.

The light meter means 3 includes a movable member 64 which moves with the pointer 63 and which is located over a slotted support 65. The support 65 is located directly beneath the pointer 64 so that the pointer or movable member 64 can move freely over the support 65 but can be deflected only through a slight distance in a downward direction before engaging the member 65, and the support member 65 is formed with the elongated slot 66 which is adapted to be partly entered into by the scanning member 67 which is capable of scanning the position of the movable member 64 in a manner well known in the art. This scanning member 67 forms part of a scanning means which includes the elongated vertically shiftable member 68 formed with the elongated slot 69 which respectively receive the stationary pins 70, so that in this way the member 68 is guided for up and down movement. The member 68 of the scanning means is connected to one end of a spring 71 the opposite end of which is connected to a stationary part of the camera, and this spring 71 urges the scanning means 67, 68 downwardly to a position where the bottom scanning edge of the member 67 will engage the movable member 64 of the light meter means 3, so that in this way the extent of downward movement of the scanning means 67, 68 by the spring 71 will be determined by the lighting conditions, as is well known in the art. Thus, the light meter means 3 and the scanning means 67, 68 form a pair of means which, in a manner described below, automatically set one of the exposure-determining factors, this factor being the diaphragm in the illustrated example, and the moving means 4–6 is capable of adjusting the position of the light meter means 3 relative to the scanning means 67, 68 in order to compensate for the manual setting provided by the manual setting means 40 and the manual setting means 20, as described above.

In the rest position of the parts which is illustrated in FIG. 1, a pin 72 which is fixedly carried by the member 68 is urged by the spring 71 against a projection 73 of an elongated member 74 which forms part of a manually operable release means, this member 74 being urged upwardly to the illustrated position by a return spring 75 which is stronger than the spring 71. The manually operable release means 74 is formed with elongated slots 76 receiving stationary pin 77 so that in this way the member 74 is guided for vertical movement, and an angularly bent portion 78 of the member 74 extends to the exterior of the camera and carries a finger-piece 79 which is accessible to the operator, so that the operator can move the finger-piece 79 downwardly in the direction indicated by the arrow b in FIG. 1, in order to allow the spring 71 to move the scanning means 67, 68 downwardly, and in this way it is possible for the operator to manipulate the release means 74 in order to release the scanning means 67, 68 so that it will scan the position of the movable member 64 of the light meter means 3.

The lower end of the elongated member 68 fixedly carries a pin 80 against which a lug 81 of a rotary adjusting ring 82 is urged by an unillustrated spring, this rotary adjusting ring 82 serving to set the diaphragm of the objective during rotation about the optical axis in a manner well known in the art. The diaphragm-adjusting ring 82 is arranged in a known way within the shutter housing 34 and is placed in operative connection with the turnable diaphragm ring of the interchangeable objective 35 through a known structure which includes a pair of projections respectively carried by the diaphragm ring of the objective and the ring 82 so that when the latter turns its turning is transmitted to the diaphragm ring of the objective so that the diaphragm of the interchangeable objective will be adjusted in a manner well known in the art by turning of the ring 82.

The manually operable release means 74, in addition to releasing the scanning means 67, 68, releases a lock means which locks the moving means 4–6 against operation during the time that the scanning means operates to scan the position of the movable member 64, and this lock means is released by a projection 83 of the elongated member 68. This projection 83 engages a portion 84 of a lock lever 85 supported for turning movement by a stationary pin 86 and urged in a counterclockwise direction, as viewed in FIG. 1, by the spring 87 which is connected at one end to the lever 85 and at its opposite end to a stationary part of the camera. The lever 85 carries a tooth 88 which is adapted to engage a rack 89 fixedly carried by the elongated member 6 of the moving means, so that when the tooth 88 is located between a pair of teeth of the rack 89 the lock means 85 is in its locking position preventing the moving means 4–6 from moving the light meter means 3 relative to the scanning means 67, 68. Thus, when the operator moves the finger-piece 79 downwardly not only will the manually operable release means release the scanning means 67, 68, but in addition it will release the lock means 85 which locks the moving means 4–6 against operation.

With the parts in the position shown in FIG. 1, if the operator turns the manually operable setting means 20 in order to introduce the factor of the speed of the film which is used in the camera, then the pinion 19 cooperates with the rack 18 for shifting the elongated motion transmitting member 15 in the direction of the arrow c or in the opposite direction, and as a result through the pin-and-slot connection 14, 12 the lever 11 is turned about the pin 30 which is stationary at this time, and thus the turning of the lever 11 about the pin 30 is transmitted, depending upon the direction of turning of the lever 11, through one or the other of the springs 49 and 50 to the pin 9 which remains at the central part of the slot 10 but nevertheless moves the member 6 so that through the rack 5 and the pinion 4 the light meter means 3 will be angularly adjusted in accordance with the speed of the film which is set by the manually operable setting means 20. At this time the spring pressed ball 42 holds the ring 40 stationary, and thus the pin 37 does not move, and of course the support means 33 is maintained in a given position by cooperation of the spring 43 with the support means 33 to maintain the projection 45 thereof against the projection 46, and thus the lever 31 remains stationary so that its pin 30 will form the turning axis for the lever 11 when the manually operable setting means 20 is turned by the operator. Of course, the operator can easily overcome the force of the detent structure 25–29. In this way the light meter means is moved relative to the scanning means in order to compensate for the film speed which has been introduced into the camera.

In a similar manner the position of the light meter relative to the scanning means is adjusted in order to compensate for the exposure time which is set into the camera. When the operator turns the ring 40 in order to set the exposure time, the shaft 39 together with the lever 38 will turn, and thus the pin 37 by cooperation with the slot 36 will turn the lever 31 about the pivot 32 in one direction or the other, and the pin 30 will turn the lever 11 about the pin 14 which remains stationary and acts at this time as a pivot for the lever 11. In this case also the turning movement of the lever 11, depending upon the direction of turning thereof, will be transmitted through the spring 49 or the spring 50 to the pin 9 which moves the elongated member 6 so that the rack 5 will turn the pin 4 and thus the light meter 3 will be positioned to compensate for the exposure time.

Of course, when a new objective is attached to the camera, the projection 46 thereof will engage the projection 45 of the support means 33 so as to shift the latter along the unillustrated arcuate guide, in opposition to the spring 43, and thus the entire lever 31 will at this time be shifted relative to the pin 37 of the lever 38 which remains stationary inasmuch as the exposure time is not adjusted during attaching of the objective to the camera. The movement of the support means 33 in the direction of the arrow a shown in FIG. 1 causes the lever 31 to turn about the stationary pin 37, and this will also result in turning of the lever 11 by the pin 30 so that the turning of the lever 11 will set the light meter means 3 through the moving means 4–6 to a position which will compensate for the largest exposure aperture which can be provided by the particular objective 35 which is attached to the camera, and in this case also the movement is transmitted to the pin 9 through one or the other of the springs 49, 50, as described above.

During the time when the ring 40 is turned in order to manually introduce the exposure time, the turning of the lever 31 about the pivot pin 32 will cause the free end of the pin 30 to ride along the curved edge 52 producing substantially no turning of the lever 53 inasmuch as the curvature of the edge 52 has a radius substantially equal to the distance between the free end of the pin 30 and the pivot pin 32, as described above, so that during adjustment of the exposure time the scale which is visible through the window 62 has substantially no movement relative to this window 62. However, when a new objective 35 is attached to the camera, the movement of the projection 45 by the projection 46 causes the lever 31 to move with the support means 33 in the direction of the arrow a, and the extent of movement of the support means 33 will be determined by the largest aperture which can be provided by the diaphragm of the particular objective, as pointed out above. The movement of the support means 33 along the unillustrated arcuate guide therefor provides on the one hand a turning of the lever 31 about the pin 32 as a result of movement of the slot 36 of the lever 31 relative to the stationary pin 37, and on the other hand the elevation of the top end of the pin 30 will change as a result of the movement of the support means 33. The turning of the lever 31 at this time will turn the lever 11 so as to transmit through the member 6 and the transmission 4, 5 movement to the light meter 33 whose angular position is therefore adjusted in accordance with the largest aperture of the particular objective, and in addition the change in elevation of the top end of the pin 30 will control the angular position of the lever 53 which forms a positioning means and which thus causes longitudinal shifting of the indicating means 58 to position in alignment with the window 62 a scale of aperture sizes corresponding to the diaphragm of the objective which has been attached to the camera. Thus, as the pin 30 moves downwardly the spring 55 will turn the positioning lever 53 in a clockwise direction, as viewed in FIG. 1, and the arm 56 will move the indicator means 58 to the right, as viewed in FIG. 1, during the time that an objective is being attached to the camera, and the extent of movement of the indicating means 58 to the right, as viewed in FIGS. 1 and 2, will be determined by the position of the projection 46 of the objective when the objective has been fully attached to the camera through the bayonet connection, and thus it is possible to automatically position in alignment with the window 62 a scale corresponding to the particular objective.

Of course, it is not essential to locate on the scale-carrier 61 a plurality of diaphragm scales. It is also possible, for example, to provide on the carrier 61 scales of combinations of exposure time and aperture appropriate to the several interchangeable objectives, if the camera control structure is so arranged that both the exposure time and the aperture are automatically controlled. In such a case the manually operable setting means 40 would not be used to set the exposure time and could be used instead to set other exposure-determining factors such as filter factors in accordance with a particular filter which is used with a camera or in order to make corrections for back lighting, for example.

When the operator moves the finger-piece 79 downwardly in the direction of the arrow b shown in FIG. 1, the release means 74 releases the scanning means 67, 68 as well as the lock means 85, and the spring 71 moves the scanning member 67 downwardly until it engages the movable member 64 of the meter 3, pressing this movable member 64 against the support 65 while the scanning member 67 enters partly into the slot 66. Inasmuch as the member 64 assumes a position determined by the lighting conditions, while the position of the entire light meter has been adjusted to compensate for the manually determined exposure factors, film speed and exposure time in the above example, the extent of movement of the scanning means as determined by the member 64 will automatically set the diaphragm in accordance with all of these factors. The setting takes place as a result of movement transmitted to the ring 82 through the lug 81 and the pin 80, as described above. Of course, the release means, because it releases the lock means 85, causes the latter to lock the moving means 4–6 against the movement, so that the operator cannot change the position of the light meter means 3 during the time that the manually operable release means 74 has been actuated to release the scanning means.

Assuming now that while the finger-piece 79 is depressed the operator, perhaps through inadvertence, turns the ring 40, then in this case the shaft 39 and the lever 38 will turn so that the pin-and-slot connection 37, 36 will turn the lever 31 about the pin 32. This movement is transmitted through the pin 30 to the lever 11 as described above. Inasmuch as the elongated member 15 is maintained stationary through the detent structure 25–29 at this time, the lever 11 seeks to turn about the pin 14. This would result, as described above, in a movement of the elongated member 6, but since the member 6 is locked by the lock means 85 at this time, the member 6 can at best move through only extremely short distance which is of no consequence, the tooth 88 cooperating with the rack 89 to prevent movement of the member 6, as described above. Therefore, at this time, any substantial turning of the manually operable exposure-time setting ring 40 will only result in turning of the lever 11 about the pin 14 so as to shift the elongated slot 10 relative to the pin 9, and in this way one or the other of the springs 49 and 50, depending upon the direction of turning of the ring 40, will be deflected by the pin 9 away from the pin 51. The length of the slot 10 is made sufficiently great so that the ring 40 can be turned throughout its entire range of turning from one end position to the other without bringing either end of the slot 10 into engagement with the pin 9.

When the operator releases the ring 40 it will be maintained in the position to which it has been turned by the releasable holding means 41, 42 which is capable of overcoming the force of the spring 49 or 50, so that the ring 40 will be reliably maintained in the position to which it has been turned by the operator, even if the finger-piece 79 is depressed at this time. As soon as the operator releases the finger-piece 79, the release means 74 returns to its rest position, under the action of the return spring 75, and as a result the scanning means 67, 68 is also returned to its rest position. Of course, the return of the release means 74 to its rest position also causes the projection 83 of the member 68 to return the lock means 85 to its rest or inactive position, and as a result the tooth 88 moves away from the rack 89. At this instant that one of the springs 49 or 50 which has been deflected away from the pin 51 and engages the pin 9 acts on the latter pin to return it to the center of the slot 10 while simultaneously shifting the elongated member 6, so that the moving means 4–6 will now act on the light meter means 3 to turn the latter relative to the scanning means 67, 68 in accordance with the particular setting of the exposure time through the ring 40, and thus with the structure of the invention not only is it not possible to adjust the light meter means during operation of the scanning means but in addition any adjustment which is made during operation of the scanning means is stored in the transmission means by the storing means formed by the springs 49 and 50 and this storing means will automatically introduce the setting as soon as the lock means releases the moving means.

Of course, the same operations will take place if the operator turns the ring 20, instead of the ring 40, under the above conditions where the finger-piece 79 is depressed. The turning of the ring 20 under these conditions will also deflect one of the springs 49 and 50, and in the same way the stored setting will be introduced automatically as soon as the moving means is unlocked by the return of the release means to its rest position.

Figure 3:
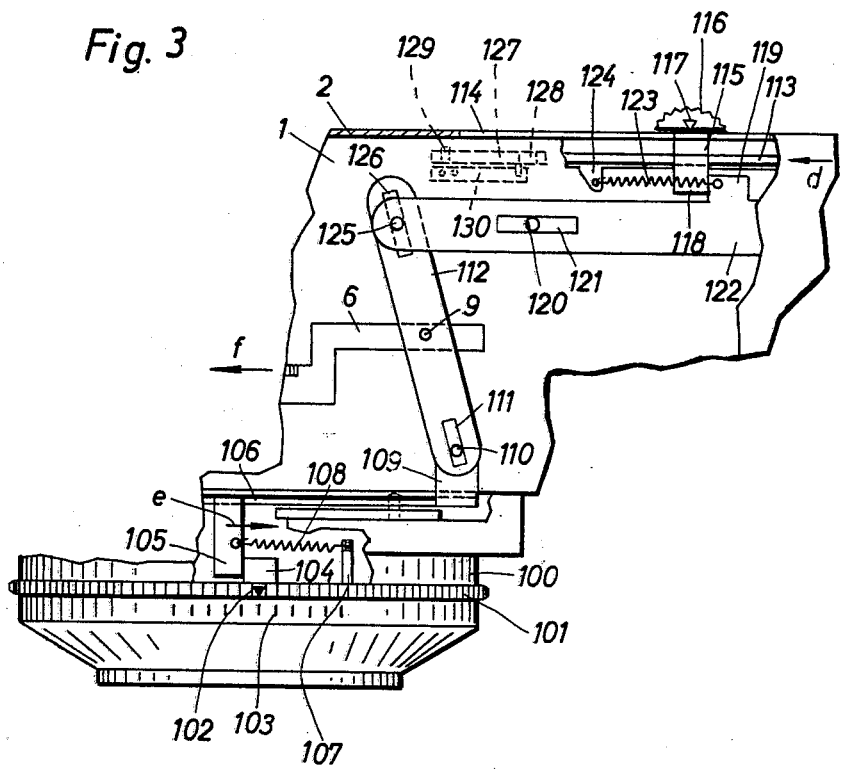
FIG. 3 is a fragmentary top plan view illustrating another possible embodiment of a structure according to the present invention.

In the embodiment of the invention which is illustrated in FIG. 3 the camera may include a permanent objective which is permanently fixed with the camera. The shutter housing 100 turnably carries the manually turnable ring 101 which forms a manually operable setting means for setting the exposure time in the illustrated example. The ring 101 carries for this purpose an index 102 which cooperates with a stationary scale 103 of exposure times. The adjustable ring 101 fixedly carries a stop member 104 which is engaged by a second stop member 105 which is fixedly carried by a longitudinally shiftable motion transmitting member 106 guided for straightline movement to the right and left, as viewed in FIG. 3, by any suitable guide structure such as the pin-and-slot structure described above. A spring 108 is connected at one end to the projection 105 and at its opposite end to a pin 107 fixedly carried by the ring 101, so that the spring 108 urges the stop members 104 and 105 into engagement with each other. The elongated, longitudinally movable, motion transmitting member 106 fixedly carries a lug 109 which in turn fixedly carries a pin 110 extending into an elongated slot 111 extending longitudinally of and formed in a lever 112 which is pivotally connected by the pin 9 to the elongated member 6 which has been described above. The structure which cooperates with the member 6 of FIG. 3 is identical with that described above. Thus, the lever 112 is pivotally connected at its central portion to the member 6 by the pin 9.

The plate 1 also carries an elongated motion transmitting member 113 fixed to a lug 115 which extends through an elongated slot 114 formed in the rear wall of the cover 2, and the lug 115 fixedly carries at the exterior of the cover 2 a finger-piece 116 carrying an index 117 cooperating with a scale of film speeds located at the rear exterior surface of the cover 2. The elongated motion transmitting member 113 is also guided for movement to the left and right, as viewed in FIG. 3, and it fixedly carries an elongated stop member 118 which is engaged by a stop member 119 of an elongated motion transmitting member 122 guided by pin-and-slot connections 120, 121 for movement to the left and right, as viewed in FIG. 3. A spring 123 is connected to the stop member 119 as well as to a lug 124 fixedly carried by the member 113, so that the spring 123 urges the pair of stop members 118 and 119 into engagement with each other. The elongated motion transmitting member 122 fixedly carries a pin 125 extending into an elongated slot 126 formed in and extending longitudinally of the lever 112.

Thus, the lever 112 is capable of being turned either by the elongated motion transmitting member 106 or by the elongated motion transmitting member 122. In the event that the member 113 is shifted in the direction of the arrow d, the spring 123 will cause the projection 119 to follow the projection 118, so that these projections or stop members will be maintained in engagement with each other, while when the elongated motion transmitting member 106 is moved in the reverse direction, indicated by the arrow e, this latter movement in the direction of the arrow e is brought about by the action of the spring 108 causing the stop member 105 to follow the stop member 104. In the embodiment of FIG. 3 the lever 112 together with the structure for turning the latter in response to movement of the ring 101 or the finger-piece 116, forms a means for totalling the exposure-determining factors manually introduced into the camera and adjusting the light-meter means to compensate for the sum of these settings, in the same way as the above-described structure of FIGS. 1 and 2, and at the same time with this structure of FIG. 3 there will also be a storing of the manual settings in the event that these manual settings are carried out at a time when the member 6 is locked against movement in the manner described above. When the lock means does not act on the member 6 the springs 108 and 123 act to maintain the parts in a predetermined position corresponding to the position of the pin 9 at the center of the slot 10 in the embodiment of FIGS. 1 and 2.

A releasable detent structure also cooperates with the elongated member 113 for releasably holding it in the position to which it is manually moved by the operator. This releasable detent structure includes the lever 127 provided with a tooth 128 and turnable about a stationary pin 129, a spring 130 acting on the lever 127 to urge the tooth thereof against a row of teeth carried by and extending from the underside of the elongated member 113. Thus, this construction corresponds to the detent means 25–29 shown in FIG. 1.

Assuming that with the embodiment of FIG. 3 the member 6 has been locked against movement, in the manner described above, and the operator turns the ring 101 in the direction of the arrow e, then the stop member 104 will move away from the stop member 105 while the spring 108 becomes tensioned, since at this time the member 106 will be incapable of moving in the direction of the arrow e since the member 6 is locked against movement. Thus, the spring 108 will become tensioned while the stop member 104 will be displaced away from the stop member 105, and as soon as the member 6 is unlocked the spring 108 will move the member 105 into engagement with the stop member 104 turning the lever 112 about the pin 125 while moving the member 6 so as to adjust the position of the light meter relative to the scanning means, as described above. A releasable detent means holds the ring 101 in the position to which it has been moved by the operator, this releasable detent means being, for example, identical with the detent means 41, 42 of FIG. 2.

If the operator turns the ring 101 in a direction opposite to that indicated by the arrow e in FIG. 3 while the elongated member 6 is locked against movement, then of course the stop member 104 will move the stop member 105 in a direction opposite to that indicated by the arrow e. The elongated motion transmitting member 106 will of course also move in the same direction, but since the member 6 is locked against movement the lever 112 can at this time only turn about the pin 9. This turning of the lever 112 about the pin 9 will cause the elongated motion transmitting member 122 to move to the right, as viewed in FIG. 3, in a direction opposite to that indicated by the arrow d, with the result that the stop member 119 will move away from the stop member 118 and the spring 123 will become tensioned, the detent structure which co-operates with the member 113 maintaining it in the position to which it has been set, even though the spring 123 becomes tensioned. When the lock means moves to its unlocking position releasing the member 6, under these conditions, the spring 123 will return the member 122 to its initial position where the stop member 119 engages the stop member 118, and thus in this way there will also be automatically made an adjustment of the light meter means relative to the scanning means as soon as the member 6 is unlocked, and under these conditions the lever 112 will turn during movement of the member 122 to the left, as viewed in FIG. 3, about the pin 110 shifting the pin 9 and the member 6 in the direction of the arrow f at this time.

Of course, the same operation will obtain when the operator adjusts the finger-piece 116 while the member 6 is locked. Thus, if the finger-piece 116 is moved in the direction of the arrow d, then the spring 123 will become tensioned in order to store the manual setting provided by the finger-piece 116 until the lock means releases the member 6, while if the finger-piece is moved in a direction opposite to that indicated by the arrow d, then the lever 112 will be turned by the member 122 in a clockwise direction about the pin 9, and the member 106 will be moved in a direction opposite to that indicated by the arrow e with the stop member 105 moving away from the stop member 104 so as to tension the spring 108, and in this case as soon as the member 6 is released by the lock means the spring 108 will return the member 105 to engagement with the stop member 104 and will shift the member 6 so as to introduce in this way a correcting adjustment in accordance with the setting made by the finger-piece 116.

Instead of an arrangement as shown in FIG. 3 where a pair of stop members 104 and 118 respectively carried by the pair of manually operable setting means 101 and 113 cooperate with a pair of stop members 105 and 119, respectively, carried by elongated motion transmitting members which act on the lever 112, it is possible to connect the members 106 and 122 directly to the manually operable setting means 101 and 113 so that the manually operable setting means will themselves form the motion transmitting members. In this case the motion transmitting members 106 and 122 would carry projections which respectively engage the opposite side edges of the lever 112 and the springs would urge the ends of the motion transmitting members 106 and 122 into engagement with the side edges of the lever 112. Thus, the member 122 could be directly connected with the member 113 so as to move therewith, and the left end of the member 122 could engage the right edge of the lever 112 with a spring connected between the member 122 and the lever 112 so as to urge the right edge of the latter into engagement with the left end of the member 122, as viewed in FIG. 3, and in the same way the right end of the member 106, which would in this case be directly connected with the member 101, would be urged into engagement with the left edge of the lever 112, as viewed in FIG. 3, by a spring connected between the lever 112 and the member 106. It will be found that with this construction also the transmission means would include a structure for storing the settings made by the manually operable setting means until the member 6 is unlocked.

Figure 4:
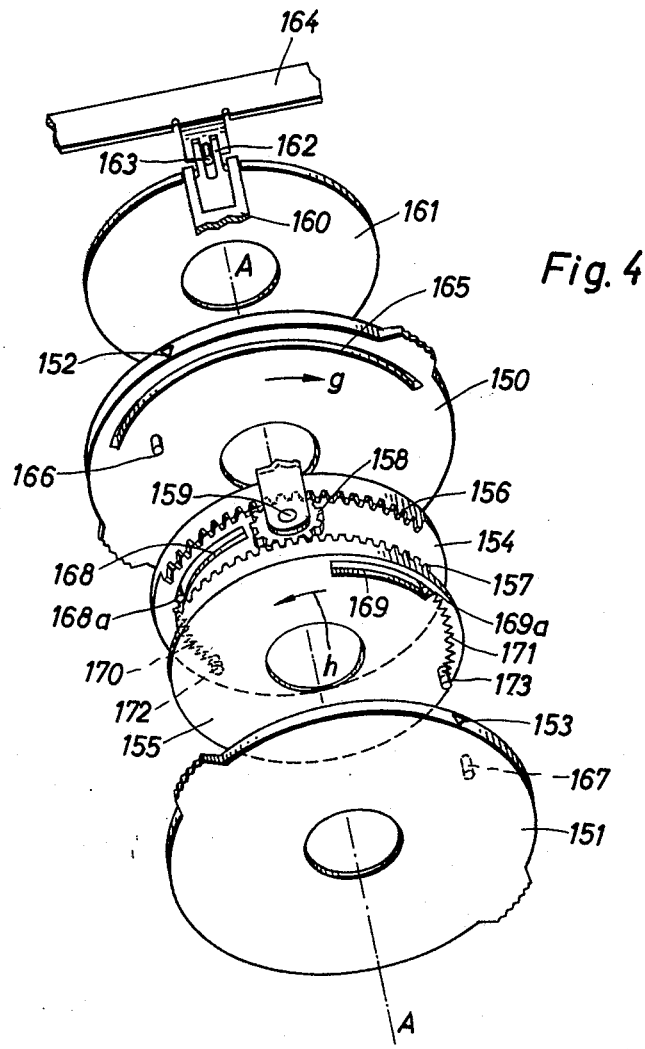
FIG. 4 is a fragmentary, perspective, exploded view illustrating still another embodiment of a structure according to the present invention.

In the embodiment illustrated in FIG. 4 there is a camera which is also adapted to carry a fixed objective which cannot be removed from the camera. With this embodiment there are a pair of manually operable setting means 150 and 151 in the form of rings which are supported for rotary movement about the optical axis A—A. The rings 150 and 151 are respectively provided with indexes 152 and 153. The ring 150 can be turned so as to align the index 152 with a selected graduation of a scale of film speeds, and the ring 151 can be turned by the operator so as to align the index 153 with a selected graduation of an unillustrated scale of exposure times. Between the pair of rings 150 and 151 there are supported, also for rotary movement about the optical axis A—A, a pair of sun gears 154 and 155. Each of these sun gears has a toothed peripheral portion, and it will be seen that the sun gear 154 is provided with the peripheral teeth 156 while the sun gear 155 is provided with the peripheral teeth 157. A planetary gear 158 extends between and meshes with the teeth 156 and 157. This planetary gear 158 is supported for rotary movement by a pin 159 which is carried by an arm 160 which extends parallel to the optical axis and which is fixedly carried by a ring 161 which is also supported for rotary movement about the optical axis A—A. The arm 160 passes through an arcuate slot 165 which is formed in the ring 150, the slot 165 extending along a circle whose center is in the optical axis and being long enough to guarantee that at all possible settings of the camera the ends of the slot 165 will not engage the arm 160. The rotary ring 161 forms a transmission member and is provided with a bifurcated portion 162 receiving a pin 163 which is fixed to a lug which extends from an elongated motion transmitting member 164. This member 164 corresponds to the member 6 of the above-described embodiments and is provided with rack teeth which mesh with the pinion which is fixed coaxially to the light meter housing so that when the member 164 moves longitudinally to the right or left, as viewed in FIG. 4, any suitable guiding structure being provided to guide the member 164 for longitudinal movement, the angular position of the light meter means relative to the scanning means will be changed. Inasmuch as the connection of the member 164 to the light meter as well as the light meter means itself and also the scanning means, the manually operable release means, and the lock means for locking the member 164 against movement when the release means is actuated to release the scanning means are all identical with the structure described above, these features are not illustrated.

The rotary manually operable setting means 150 and 151 respectively carry pins 166 and 167 which are fixed to the rings 150 and 151 and extend parallel to the optical axis. The pin 166 is received in an arcuate slot 168 formed in the sun gear 154 at the same radial distance from the optical axis as the pin 166 and extending along a circle whose center is in the optical axis, and the pin 167 is received in an arcuate slot 169 which is formed in the sun gear 155 at the same radial distance from the optical axis as the pin 167 and also extending along a circle whose center is in the optical axis. A spring 170 is fixed to the pin 166 and to a pin 172 which is fixedly carried by the sun gear 154, and this spring urges the end 168a of the slot 168 and the pin 166 toward each other. A spring 171 is fixed to the pin 167 and a pin 173 which is fixedly carried by the sun gear 155, and the spring 171 urges the end 169a of the slot 169 and the pin 167 toward each other. The length of the slots 168 and 169 is at least equal to the total range of adjustment of that one of the rings 150 and 151 which is turned through the larger angle from one end to the other end of its range of adjustment. Moreover, unillustrated detent means cooperates with each of the rings 150 and 151 for releasably maintaining them in their manually adjusted positions, and this detent structure can correspond to the detent means 41, 42 of FIG. 2. With the embodiment of FIG. 4, the sun gears 154 and 155 correspond to the levers 11 and 112 described above in that they serve to totalize the settings which are manually introduced into the camera for the purpose of adjusting the light meter means relative to the scanning means in order to compensate for these settings. The planetary gear 158 together with the elongated member 164 serve to transmit the movement of the sun gears to the light meter means to adjust the latter. Moreover, the spring connection 170 between the pin 166 and the sun gear 154 as well as the spring connection 171 between the pin 167 and the sun gear 155 forms a yieldable storing means which serves to store in the transmission, in the event that the element 164 is locked when either of the rings 150 or 151 is turned, the settings introduced by the members 150 and 151 until the element 164 is unlocked whereupon the structure will then operate automatically to introduce the settings which were made while the element 164 was locked against movement.

Assuming, for example, that the operator has depressed the finger-piece 79 so as to release the scanning means and thus also release the lock means to lock the elongated member 164 against movement, and that at this time the operator turns the manually operable setting means 150 in the direction of the arrow g, then the spring 170 will pull in the same direction on the sun gear 154 to tend to cause the end 168a of the slot 168 to follow the pin 166. The sun gear 154 can turn only when with the sun gear 155 remaining stationary it is possible for the planetary gear 158 to ride along the teeth 157 and to turn the members 161 through the arm 160 as well as shift the member 164, or when with the disc 161 maintained stationary, as it is when the element 164 is locked against movement, it is possible for the sun gear 155 to turn in the direction of the arrow h. Since the element 164 is locked against movement at this time, the ring 161 cannot turn, and furthermore it is not possible for the sun gear 155 to turn in the direction of the arrow h because the end 169a of the slot 169 engages the pin 167 which is fixed to the member 151 which is releasably maintained against movement by the detent structure. The spring 170 is not strong enough to overcome the force of the releasable detent structure. Therefore, under these conditions only the ring 150 will turn in the direction of the arrow g and the pin 166 will move away from the end 168a of the slot 168, moving along this slot 168 while increasing the tension of the spring 170. The light meter means and scanning means are in no way influenced because the element 164 is locked against movement. However, when the ring 150 has been placed in the selected position, the detent structure will hold the ring 150 in its adjusted position in opposition to the tensioned spring 170, and the operator can release the ring 150.

When the operator releases the finger-piece 79 so that the scanning means as well as the lock means are returned to their inactive or rest positions, the member 164 and thus the ring 161 and the arm 160 are free to turn, and the spring 170 will now turn the sun gear 154 in the direction of the arrow g until the end 168a of the slot 168 again engages the pin 166, and at this time, since the sun gear 155 still cannot turn in the direction of the arrow h, the teeth 156 turn the planetary gear 158 so that it rides along the stationary teeth 157, and the ring 161 turns so as to shift the member 164 and thus adjust the position of the light meter means with respect to the scanning means.

If, in the above example, the operator, instead of turning the ring 150 in the direction of the arrow g, turned it in the opposite direction, then the pin 166 by pressing against the end 168a of the slot 168 would turn the sun gear 154 in the direction of the arrow h. The turning of the sun gear 154 in this direction causes the planetary gear 158 to turn the sun gear 155 in a direction opposite to that indicated by the arrow h, and the sun gear 155 can turn in this direction since the end 169a of the slot 169 will now move away from the pin 167 which is maintained stationary with the ring 151, and as a result at this time it is the spring 171 which becomes tensioned, and of course the ring 150 will again be releasably maintained in the selected position when the operator releases the ring 150 under these conditions. When the operator now releases the finger-piece 79 so as to return the scanning means and the lock means to their idle positions, the spring 171 will be able to return the sun gear 155 to the position where the end 169a of the slot 169 engages the pin 167. The turning of the ring or sun gear 155 in the direction of the arrow h by the spring 171 at this time would tend to turn the ring or sun gear 154 in the direction of the arrow g, but such turning is not possible because the stationary pin 166 engages the end 168a of the slot 168, so that as a result while the gear 155 is turned by the spring 171 in the direction of the arrow h, until the end 169a of the slot 169 engages the pin 167, the gear 158 rides along the stationary teeth 156 and the arm 160 together with the ring 161 turn about the opical axis, and the drive is transmitted to the member 164 which adjusts the angular position of the light meter means with respect to the scanning means.

Similar results are obtained if it is the manually operable setting means 151 which is turned by the operator. Thus, if the exposure-time setting ring 151 is turned by the operator while the member 164 is locked against movement, then if the ring 151 is turned in a counterclockwise direction, the spring 171 will become tensioned while the pin 167 moves away from the end 169a of the slot 169, so that in this way the setting of the ring 151 is stored to be automatically introduced when the element 164 is unlocked, while if the ring 151 is turned in a clockwise direction, as viewed in FIG. 4, the ring 155 will also turn in a clockwise direction and the planetary gear 158 will turn about the pin 159 and will turn the sun gear 154 in the direction of the arrow $h$ so as to displace the end 168a of the slot 168 away from the pin 166 while tensioning the spring 170 which thus stores the setting of the ring 151 under these conditions and introduces the setting automatically when the element 164 is unlocked.

Of course, variations in the details of the above-described structure or the invention is possible. For example, in all of the embodiments a spring structure is relied upon to store the manual settings until the structure which adjusts the position of the light meter is unlocked, but it is equally possible to use magnets to store these settings and to move the structure as soon as the lock means is returned to its unlocking position. Furthermore, instead of adjusting the position of the light meter means relative to the scanning means, it is equally possible to adjust the position of the scanning means relative to the light meter means. Moreover, the manually selected settings need not be limited to exposure time and film speed, since it is also possible to make manual settings for the use of various filters or for corrections to take into consideration back lighting and the like, and these exposure-determining factors can also be used to adjust the position of one of the pair of means, namely the light meter means and the scanning means, relative to the other.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera to which a plurality of objectives are adapted to be interchangeably connected, in combination, a pair of means cooperating to automatically set a first exposure-determining factor in accordance with the lighting conditions, said pair of means including a light meter means having a movable member which assumes positions determined by the lighting conditions and a scanning means for scanning the movable member of the light meter means; moving means operatively connected to one of said pair of means for moving the same relative to the other of said pair of means; actuating means engaging said moving means for actuating the same; manually operable means for setting in to the camera a second exposure-determining factor, said manually operable means being operatively connected to said actuating means for actuating the latter to influence said moving means for changing the position of said one of said pair of means relative to the other of said pair of means to compensate for the second factor which is manually introduced into the camera; means carried by the interchangeable objectives and engaging said actuating means for moving the latter to influence said moving means for changing the position of said one of said pair of means relative to the other of said pair of means according to the largest aperture which can be provided by the particular objective which is attached to the camera; indicating means carrying a plurality of scales which respectively correspond to the plurality of interchangeable objectives; and positioning means also moved by said actuating means when the latter is moved during connection of a particular objective to the camera, said positioning means being operatively connected to said indicating means for positioning the latter to indicate to the operator the particular scale which corresponds to the particular objective which is attached to the camera.

2. In a camera to which a plurality of objectives are adapted to be interchangeably connected, in combination, a pair of means cooperating to automatically set a first exposure-determining factor in accordance with the lighting conditions, said pair of means including a light meter means having a movable member which assumes positions determined by the lighting conditions and a scanning means for scanning the movable member of the light meter means; moving means operatively connected to one of said pair of means for moving the same relative to the other of said pair of means; actuating means engaging said moving means for actuating the same; manually operable means for setting into the camera a second exposure-determining factor, said manually operable means being operatively connected to said actuating means for actuating the latter to influence said moving means for changing the position of said one of said pair of means relative to the other of said pair of means to compensate for the second factor which is manually introduced into the camera; and means carried by the interchangeable objectives and engaging said actuating means for moving the latter to influence said moving means for changing the position of said one of said pair of means relative to the other of said pair of means according to the largest aperture which can be provided by the particular objective which is attached to the camera, said actuating means including an elongated lever which is supported for shifting as well as turning movement, said manually operable means being operatively connected to said lever for turning the same and means which is carried by each of the interchangeable objective cooperating with said lever for both shifting and turning the same.

3. In a camera to which a plurality of objectives are adapted to be interchangeably connected, in combination, support means movable around the optical axis of the camera; an elongated lever pivotally carried by said support means for turning movement with respect thereto as well as for movement with said support means around the optical axis; manually operable means for manually introducing into the camera one of a plurality of exposure-determining factors, said manually operable means being operatively connected to said lever for turning the latter with respect to said support means during introduction of said one exposure-determining factor and to provide for said lever a pivot axis during movement of said support means around the optical axis; means carried by each of the interchangeable objectives and engaging said support means for moving the latter around the optical axis during attaching of the particular objective to the camera so as to turn said lever during movement thereof with said support means when one objective is changed for another; a pair of means cooperating to automatically introduce into the camera another of said exposure-determining factors in accordance with the lighting conditions, said pair of means respectively including a light meter means having a movable member and a scanning means which scans the position of said movable member; and moving means operatively connected to one of said pair of means for moving the same relative to the other of said pair of means, said lever being operatively connected to said moving means for actuating the same to move said one of said pair of means relative to the other of said pair of means in order to compensate both for the factor introduced by said manually operable means as well as for the largest exposure aperture which can be provided by the particular objective which is attached to the camera.

4. In a camera as recited in claim 3, said lever having an arcuate portion extending along a circle through approximately 90° about the optical axis and said arcuate portion being pivotally connected at an intermediate part thereof to said support means, said manually operable means being connected to said lever at one end portion thereof and said lever engaging at an opposite end portion thereof said moving means.

5. In a camera as recited in claim 3, indicating means carrying a plurality of scales which respectively correspond to the plurality of interchangeable objectives; and positioning means for positioning said indicating means to indicate to the operator that scale which corresponds to the particular objective which is attached to the camera, said positioning means including a second lever having a curved edge engaging a free end of said first-mentioned lever so that when one objective is changed for another the shifting of the support menas will shift the free end of said first-mentioned lever with consequent turning of said second lever to change the scale which will be seen by the operator, the curvature of said curved edge of said second lever being located approximately at the pivotal connection between said first-mentioned lever and said support means so that during turning of said first-mentioned lever by said manually operable means said free end of said first-mentioned lever will move along said curved edge of said second lever while producing substantially no turning of said second lever.

6. In a camera as recited in claim 5, said pair of means cooperating to automatically adjust the diaphragm of the particular objective which is attached to the camera and said plurality of scales being a plurality of aperture scales respectively corresponding to the particular objectives which are interchangeably attachable to the camera, the camera including a window through which only one of said scales is visible and said first-mentioned lever cooperating with said positioning means to render visible through said window that scale which corresponds to the particular objective which is attached to the camera.

7. In a camera, in combination, a pair of means cooperating with each other for automatically setting a first exposure-determining factor in accordance with the lighting conditions, said pair of means including a light meter means having a movable member and a scanning means for scanning the position of said movable member; manually operable release means operatively connected to said scanning means for releasing the latter to scan said member of said light meter means; moving means operatively connected to one of said pair of means for moving the same relative to the other of said pair of means; lock means released by said manually operable release means for locking said moving means against movement when said manually operable release means releases said scanning means to scan said member of said light meter means; manually operable setting means for manually setting into the camera a second exposure-determining factor; and transmission means transmitting movement of said manually operable setting means to said moving means to actuate the latter to move said one of said pair of means relative to the other of said pair of means to compensate for the manual setting of said second exposure-determining factor into the camera, said transmission means storing the setting of said manually operable setting means if the latter is actuated when said manually operable release means has also been actuated and said moving means is locked by said lock means against movement until said manually operable release means is released by the operator to return said scanning means to a rest position thereof and to return said lock means to an inactive, unlocking position thereof, whereupon said transmission means will then actuate said moving means in accordance with the setting of said manually operable setting means stored by said transmission means.

8. In a camera, in combination, a pair of means cooperating with each other for automatically setting a first exposure-determining factor in accordance with the lighting conditions, said pair of means including a light meter means having a movable member and a scanning means for scanning the position of said movable member; manually operable release means operatively connected to said scanning means for releasing the latter to scan said member of said light meter means; moving means operatively connected to one of said pair of means for moving the same relative to the other of said pair of means; lock means released by said manually operable release means for locking said moving means against movement when said manually operable release means releases said scanning means to scan said member of said light meter means; manually operable setting means for manually setting into the camera a second exposure-determining factor; and transmission means transmitting movement of said manually operable setting means to said moving means to actuate the latter to move said one of said pair of means relative to the other of said pair of means to compensate for the manual setting of said second exposure-determining factor into the camera, said transmission means storing the setting of said manually operable setting means if the latter is actuated when said manually operable release means has also been actuated and said moving means is locked by said lock means against movement until said manually operable release means is released by the operator to return said scanning means to a rest position thereof and to return said lock means to an inactive, unlocking position thereof, whereupon said transmission means will then actuate said moving means in accordance with the setting of said manually operable setting means stored by said transmission means, said transmission means including a pair of transmission members elastically connected to each other and tending to automatically assume a predetermined position relative to each other, said transmission members being yieldably maintained in said predetermined position and yielding only when said manually operable setting means is actuated during a time when said moving means is locked by said locking means.

9. In a camera, in combination, a pair of means cooperating with each other for automatically setting a first exposure-determining factor, said pair of means including a light meter means having a movable member and a scanning means for scanning the movable member of the light meter means; manually operable release means cooperating with said scanning means for releasing the latter to scan said member of said light meter means; lock means also released by said manually operable release means; moving means operatively connected to one of said pair of means for moving the same relative to the other of said pair of means, said lock means locking said moving means against movement when said manually operable release means is actuated to release said scanning means; a pair of manually operable setting means for manually setting into the camera a pair of exposure-determining factors in addition to said first exposure-determining factor; and transmission means operatively connected to said pair of manually operable setting means and to said moving means for actuating the latter to move said one of said pair of means relative to the other of said pair of means in accordance with the pair of additional exposure-determining factors set into the camera by said pair of manually operable setting means, said transmission means storing settings made by said pair of manually operable setting means during a period when said moving means is locked by said lock means and said transmission means actuating said moving means in accordance with settings made by said pair of manually operable setting means under these conditions after the lock means is returned to an inactive position releasing said moving means.

10. In a camera, in combination, a pair of means for automatically setting an exposure-determining factor according to the lighting conditions, said pair of means including a light meter means having a movable member and a scanning means for scanning the position of said movable member of said light meter means; manually operable release means cooperating with said scanning means for releasing the latter to scan the position of said member of said light meter means; moving means operatively connected to one of said pair of means for moving the same relative to the other of said pair of means; lock means released by said manually operable release means for locking said moving means against operation when said manually operable release means is actuated to release said scanning means; manually operable setting means for setting into the camera at least one additional exposure-determining factor; and transmission means transmitting movement of said manually operable setting means to said moving means to move the latter for moving said one of said pair of means relative to the other of said pair of means to compensate for the manual setting of said additional exposure-determining factor, said transmission means including a pair of transmission members and a spring means transmitting movement from one to the other of said pair of transmission members and yielding when said manually operable setting means is actuated during a time when said moving means is locked by said lock means so that said spring means stores under these conditions the additional factor manually introduced by said manually operable setting means until the lock means returns to a position unlocking said moving means whereupon said spring means transmits movement between said transmission members to place said one of said pair of means in a position relative to the other of said pair of means in accordance with the manual setting of said additional exposure-determining factor.

11. In a camera, in combination, a pair of means for automatically setting an exposure-determining factor in accordance with the lighting conditions, said pair of means including a light meter means having a movable member and a scanning means for scanning said movable member; manually operable release means cooperating with said scanning means for releasing the latter to scan said member; moving means operatively connected to one of said pair of means for moving the same relative to the other of said pair of means; lock means released by said manually operable release means when the latter releases said scanning means and locking said moving means against movement when said scanning means scans said member of said light meter means; a pair of manually operable setting means for manually setting into the camera a pair of additional exposure-determining factors; and transmission means transmitting movement of said pair of manually operable setting means to said moving means to actuate the latter for moving said one of said pair of means relative to the other to compensate for the additional factors manually set into the camera by said pair of manually operable setting means, said transmission means including an elongated lever pivotally connected intermediate its ends to said moving means and pivotally connected at its ends respectively to said pair of manually operable setting means, said transmission means storing settings made by either one of said pair of manually operable setting means during the time when said moving means is locked by said lock means and until said lock means moves to an unlocking position releasing said moving means whereupon said transmission means then moves said moving means in accordance with the settings made by either one of said pair of manually operable setting means.

12. In a camera as recited in claim 11, said lever being formed intermediate its ends with an elongated opening and said transmission means including a pin fixed to said moving means and extending through said opening for pivotally connecting said lever to said moving means, and said transmission means including a pair of elongated leaf springs fixedly carried by said lever and engaging said pin at opposed surfaces thereof for storing the settings made by either one or both of said manually operable setting means during the time when said moving means is locked by said lock means.

13. In a camera as recited in claim 11, said lever including an elongated opening and said transmission means including a pin fixed to said moving means and extending through said opening for pivotally connecting said lever to said moving means, and said transmissions means including a spring means urging said pin to a central part of said elongated opening and serving to store settings made by either one or both of said manually operable setting means during the time when said moving means is locked by said lock means.

14. In a camera, in combination, a pair of means for automatically setting one of a plurality of exposure-determining factors, said pair of means including a light meter means having a movable member and a scanning means for scanning the position of said movable member of said light meter means; moving means operatively connected to one of said pair of means for moving the same relative to the other of said pair of means; manually operable release means for releasing said scanning means to scan the position of said movable member of said light meter means; lock means released by said manually operable release means for locking said moving means against movement when said manually operable release means is actuated to release said scanning means; a pair of manually operable setting means for manually setting into the camera a pair of additional exposure-determining factors; a lever pivotally connected intermediate its ends to said moving means; a pair of elongated motion-transmitting members pivotally connected to said lever respectively adjacent end portions thereof; a pair of stop members respectively fixedly carried by said pair of motion-transmitting members; a second pair of stop members respectively carried by said pair of manually operable setting means; and a pair of spring means respectively urging the stop members of said pair of manually operable setting means into engagement with the stop members of said pair of motion-transmitting members, whereby when either one or both of said manually operable setting means is actuated said moving means will move said one of said pair of means relative to the other to compensate for the factors set into the camera by either one or both of said pair of manually operable setting means while when said moving means is locked by said lock means either one or both of said spring means will yield to store the settings of either one or both of said manually operable setting means until the moving means is unlocked.

15. In a camera, in combination, a pair of means for automatically setting one of a plurality of exposure-determining factors, said pair of means including a light meter means having a movable member and a scanning means for scanning the movable member of said light meter means; manually operable release means cooperating with said scanning means for releasing the latter to scan said member of said light meter means; moving means operatively connected to one of said pair of means for moving the same relative to the other of said pair of means; lock means released by said manually operable release means, when the latter is actuated to release said scanning means, for locking said moving means against movement during the time that said scanning means scans said member of said light meter means; a pair of rotary manually operable setting means for respectively setting into the camera a pair of additional exposure-determining factors; a pair of rotary sun gears; a pair of stop members respectively carried by said pair of rotary manually operable setting means; a pair of spring means respectively urging said pair of sun gears to turn in opposite directions respectively into engagement with said pair of stop members of said pair of manually operable setting means; a planetary gear located between and meshing with said pair of sun gears; and carrier means carrying said planetary gear and operatively connected to said moving means for moving the latter when said planetary gear moves around the axis of said pair of sun gears, whereby movement of either of said manually operable setting means will be transmitted through said moving means to said one of said pair of means when said moving means is unlocked in order to compensate for the setting provided by said one manually operable setting means while if said moving means is locked during actuation by the operator of either one or both of said manually operable setting means said pair of spring means will yield to store the settings made by either one or both of said manually operable setting means until said moving means is unlocked.

16. In a camera, in combination, a pair of means for automatically setting one of a plurality of exposure-determining factors into the camera, said pair of means including a light meter means having a movable member and a scanning means for scanning the position of said movable member of said light meter means; manually operable release means cooperating with said scanning means for releasing the latter to scan said member of said light meter means, said manually operable release means having a rest position maintaining said scanning means in a rest position spaced from said movable member of said light meter means; moving means operatively connected to one of said pair of means for moving the latter relative to the other of said pair of means; manually operable setting means for setting into the camera at least one additional exposure-determining factor, said manually operable setting means being operatively connected to said moving means to actuate the latter for moving said one of said pair of means with respect to the other of said pair of means to a position which will compensate for the setting manually introduced by said manually operable setting means; an elongated rack carried by said moving means; a lever carrying a tooth which is adapted to enter into the space between a pair of teeth of said rack; and a spring urging said lever to the position where said tooth thereof will engage said rack, said manually operable release means in its rest position maintaining said lever in opposition to the force of said spring in a position where said tooth of said lever is spaced from said rack and said manually operable release means when actuated to release said scanning means also releasing said lever to said spring so that said tooth thereof will engage said rack to lock said moving means against moving during the time when said scanning means is released for scanning the position of said member of said light meter means.

17. In a camera, in combination, a pair of means cooperating to automatically set one of a plurality of exposure-determining factors, said pair of means including a light meter means having a movable member and a scanning means for scanning the position of said movable member of said light meter means; manually operable release means cooperating with said scanning means for releasing the latter to scan the position of said member of said light meter means; manually operable setting means for setting into the camera an additional exposure-determining factor; moving means actuated by said manually operable setting means and operatively connected to one of said pair of means for moving said one of said pair of means relatively to the other of said pair of means to compensate for the setting made by said manually operable setting means; lock means released by said manually operable release means for locking said moving means against operation during the time when said manually operable release means releases said scanning means to scan the position of said member of said light meter means; storing means for storing settings made by said manually operable setting means during the time when said moving means is locked by said lock means, said storing means introducing the setting made by said manually operable setting means when said moving means is no longer locked by said lock means; and releasable holding means releasably holding said manually operable setting means in its set position in opposition to the force of said storing means, said releasable holding means exerting a force stronger than that of said storing means.

References Cited in the file of this patent
UNITED STATES PATENTS
3,071,054     Singer                 Jan. 1, 1963